United States Patent [19]

Carreira

[11] Patent Number: 4,577,083
[45] Date of Patent: Mar. 18, 1986

[54] SOLDERING TECHNIQUE

[76] Inventor: A. William Carreira, 166 West Remington St., Black River, N.Y. 13612

[21] Appl. No.: 516,808

[22] Filed: Jul. 25, 1983

[51] Int. Cl.⁴ .............................................. B23K 1/04
[52] U.S. Cl. ................................. 219/85 F; 219/234; 219/85 CM
[58] Field of Search .............. 219/85 F, 85 R, 85 CA, 219/85 CM, 56.1, 56.21, 234

[56] References Cited

U.S. PATENT DOCUMENTS 1,248,812  12/1917  Costello ............................... 219/108
2,789,198   4/1957  Dye et al. ........................ 219/234 X
3,119,006   1/1964  Faulconer ....................... 219/234 X Primary Examiner—C. L. Albritton
Assistant Examiner—Catherine M. Sigda
Attorney, Agent, or Firm—Ostrolenk, Faber, Gerb & Soffen

[57] ABSTRACT

A solder application method and apparatus in which the solder element to be melted onto members to be electrically interconnected is the resistive heating element part of the solder heating circuit. A probe is provided for engagement with conductive metal associated with the area to be soldered and the solder to be melted onto the area to be soldered. This probe projects from the same housing to the area to be soldered and thereby establishes a heating circuit through the area to be soldered and through the solder. The melting of a predetermined length of solder and the dropping thereof onto the area to be soldered opens the circuit and terminates the soldering operation. Various controls may be utilized to control the amount of current, the amount of voltage, the current flow at which the soldering operation will begin, and the shaped of any particular current or voltage pulse; but an essential element is that the soldering operation commences when the probe and the solder both engage the work and terminates on the melting of the solder thereby providing automatic simplified control; and another essential element is that the solder used in the splice is the significant resistance and heating element itself rather than having external heat applied to that solder.

3 Claims, 7 Drawing Figures

SOLDERING TECHNIQUE

The present invention relates to a soldering device and method and more particularly to the application of solder to form a solder joint where an electrical heating circuit is used and where the solder which is to form a connection is part of the electrical heating circuit so that the control of the heat to the solder connection is exact and uniform and the current through the solder which establishes the passage of heat through the solder is broken at the instant the solder flows to form the electrical connection or splice.

This invention therefore relates to a major improvement in electrical soldering to provide more uniform splices, a lower percentage of failures, a quicker performance of the operation, a reduced waste of solder, obviates the waste of heat and provides a method and apparatus which reduces or obviates the damage to associate electrical components; and in addition imposes less strain on the individual performing this soldering operation thereby making the soldering operation easy and more comfortable to perform and provides less toxic dangers to any the personnel on any production line performing this soldering operation.

The essence of this discovery and invention is that the present art starts the heat where it is not wanted, overheating the area, and tried to deliver some of that heat to where it is wanted, in the solder itself, without overheating the attachments; but the method of the present invention confines the high temperatures to the solder itself by using the solder itself as the only heating element. In accordance with the present invention, only the solder should be the heating element, for the reasons stated.

BACKGROUND OF THE INVENTION

The present state of the art with respect to soldering is such that in production line formation of soldered joints, as well as in the formation of soldered joints to build apparatus from a kit, it has been found that approximately 90% of all rejections in quality control are the result of the inefficacy of the solder joints which have been formed.

In high performance devices which are intended to operate at all times and provide a certainty and continuity of operation which must be depended upon by appropriate personnel (such as in military applications as for instance rocket silos) the quality control and operational control check systems provide for daily review of the continuity of connections of all soldered joints in the entire system because of the comparatively high probability that solder joint degeneration will occur owing to inefficacy of the original solder joint and the continuous thermal expansion and contraction which is imposed on the solder joint.

In present soldering methods, the splice between two or more metal parts which is to be electrically soldered, by the application of a lower metal melting temperature metal alloy for soldering the soldering is initially performed with a rise in flux in order to obtain a flash cleaning of the spliced surfaces and of the soldering iron itself.

The soldering iron is usually a copper alloy that conducts heat developed for melting the solder onto the solder itself. Depending on the soldering apparatus, whether it is a straight soldering iron with a remote heating element or a soldering gun style with a copper alloy tip that provides in itself a resistance heating element, the control of the melt point of the solder and of the length of heat application to the solder to cause the melt results in extraordinarily wide temperature ranges. The splice can therefore be left with too low a peak temperature to complete a low resistance splice, or so overheat the splice as to damage associated heat sensitive components. The present state of the art even with installation of controls of various types with respect to temperature levels and timing does not produce a predictable splice nor a repeatable splice nor does it provide any warning of heat damage or of further problems which may arise from too cold or too hot a splice.

BRIEF DESCRIPTION OF THE INVENTION AND THE OBJECTS THEREOF

The present invention corrects the prior art weaknesses by using the solder that is to form the splice as the only part of the heating circuit to develope a significant rise in temperature. While the prior art has utilized heating elements that are external of the solder to be melted by the heat conducted to form the splice, the present invention heats the solder to be used by passing current through the solder so that the solder is the highest temperature metal at the work site. In the case of a hot iron type of soldering operation placed on the work to heat the solder either directly or indirectly through the metal at the splice at the useful soldering temperature which nevertheless is cooler than the temperature of the iron, the iron itself may be losing heat into the metal which is spliced and into associated components which might be damaged.

According to this invention the solder cannot be heated until the solder is in contact with the splice. Then the solder conducts the heavy current at very low voltage and melts onto the splice breaking the electrical path. This turns off the heat at the precise moment that the solder is flowing at the correct temperature.

By this means therefore the heat of the environment is completely controlled, the solder is the hottest element in the area, the difficulties which arise from the use of a soldering iron or a soldering gun are obviated, power is greatly conserved since it is not used to heat an element that must be hot before application or remain hot after application and the heat is not dissipated into unnecessary or deleterious areas. Since the heat is so completely controlled and the hottest point in the operation is the solder metal itself during the operation there is no danger of a burn from the use of the invention.

Since the current is controlled by the state of the solder itself with the circuit being broken when the solder melts into place, the present invention when used in a production line can average as little as two or three watts of power as opposed to the 25 to 250 watts that is presently required.

The soldering operation in accordance with the present invention utilizes power only from the moment that both the contact probe and the measured soldered piece touch the splice metals and conducts power through the solder until the solder melts and drops onto the splice. In practice, this time has been found to be less than one second. Before the melting solder inertia allows the electrical circuit to open there is a temperature rise that is substantially higher than the solder flow temperature. This heat that is above the temperature to produce the solder flow is then used in heating only the surfaces of the splice that the solder falls upon. Hence the surfaces of the splice become well soldered in a fraction of a second following the breaking of the power path. As the melting is completed, the heat is absorbed into the inner parts of the splice where the dispersion of heat cools the whole splice rapidly, this is so especially because most splices are made between excellent heat conducting metals of for instance copper, silver and appropriate alloys. This rapid cooling freezes the solder in place on the splice so that it does not run along a cool member. This helps control the location of the solder better than is performed at present.

In practice, a ten watt power flow for less than 20% of the time in production line soldering by the present invention averages about two watts of power or about 10% of the power used in the prior art. Thus, the prior art now puts 90% or more of its power where it is not needed, is not useful, is troublesome and requires excess cost related to size of equipment as well as wasted electric power and even heats the environment so that additional air conditioning may be required. In practice, the operator can solder a splice and immediately lay the newly spliced structure down and place a fingertip on the splice and will not be burned. This is because all of the spliced parts are at room temperature before the hot solder drops on the splice. Since the solder is at a controlled maximum temperature only so much heat can be introduced into the splice, this heat is quickly spread into the splice and associated connections so that where the solder may have dropped at several hundred degrees in less than two seconds it is promptly cooled to be incapable of burning a fingertip. This again relates back to avoidance of damage to heat sensitive devices such as transistors.

Thus the primary object of the present invention is the utilization of the resistance of the solder itself and heating the solder electrically.

An associated object of the present invention is the utilization of an electrical circuit which includes the solder in order to heat the solder and which is broken as soon as the solder melts thereby providing an absolutely controlled amount of electrical current and therefore of heat to the solder.

BRIEF DESCRIPTION OF THE DRAWINGS

The foregoing and many other objects of the present invention will become apparent in the following description and drawings in which.

DETAILED DESCRIPTION OF THE DRAWINGS

Figure 1:
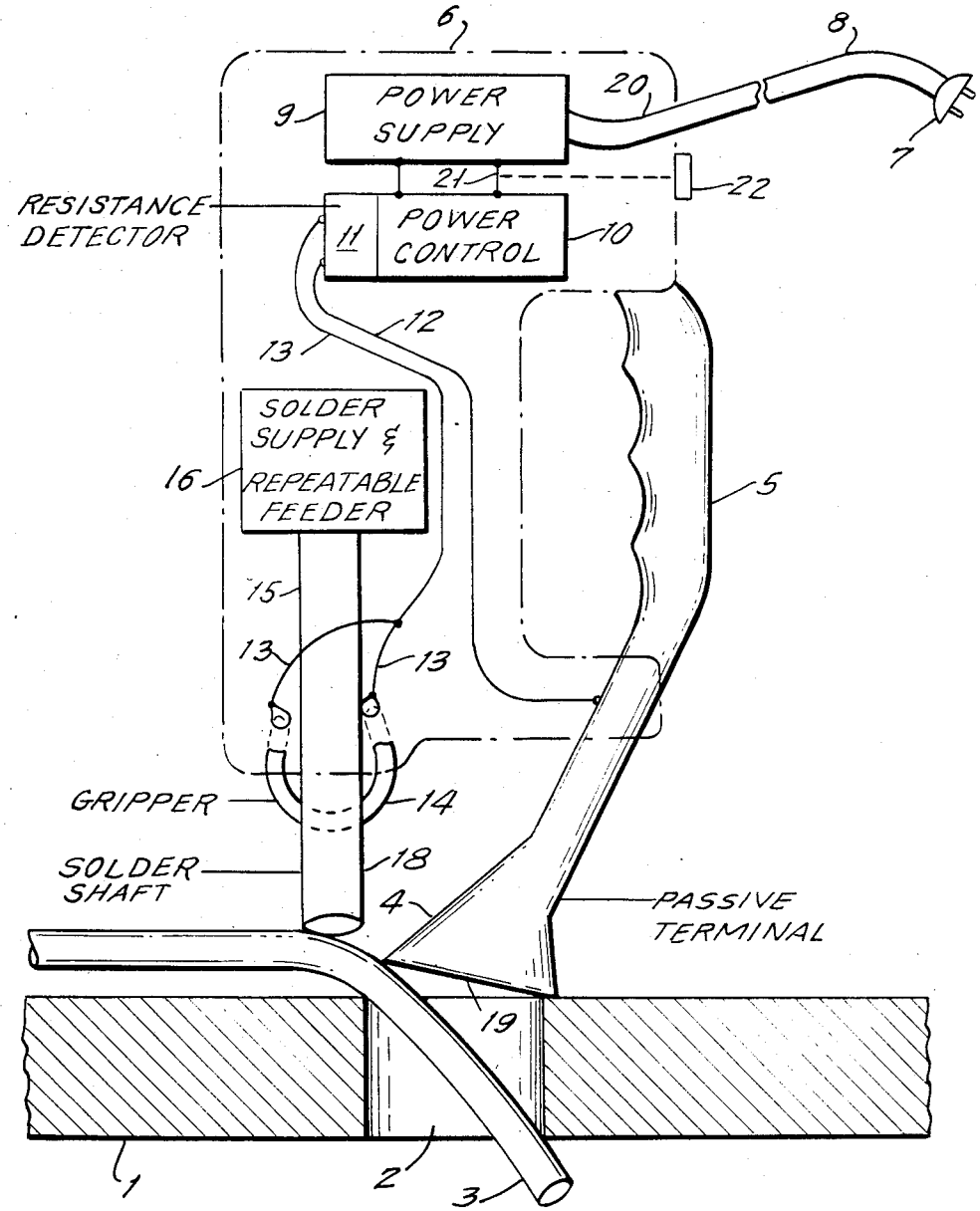
FIG. 1 is a schematic view of the soldering apparatus used in accordance with the novel method of the present invention.

Referring to the drawings and initially to FIG. 1, the schematic showing in FIG. 1 may be included in any appropriate housing which is capable of being handled readily by the user but is shown schematically here in order to distinguish all of the various parts. It should be kept in mind that the essential element of the present invention is that by inclusion of the solder in the electrical heating circuits, the resistance of the solder itself causes the solder to be heated and the solder becomes the hottest portion of the circuit. When the solder melts, the circuit is opened and thus an automatic operation is achieved.

In FIG. 1 a terminal board 1 with an appropriate opening 2 for the reception of wire 3 to be soldered to the terminal board is in this case the element on which the operation is to take place. A terminal 4 of the soldering device which is essentially a passive terminal, is provided as an extension from housing 6. Terminal 4 is electrically conductive and has an edge surface 19 which may be placed on the terminal board 1 bridging any gap between the terminal board and the wire 3 which is to be soldered to the terminal board.

The housing 6 which may assume any convenient shape but is here indicated merely schematically to illustrate the various parts and is provided with an appropriate handle 5, carries the terminal 4. A power line plug 7 is connected to a power cord 8 which in turn is connected to a power supply 9 within the housing 6. A power control device 10 for various purposes, as hereinafter described, is connected to the power supply 9 and, operating through a resistance detector 11, is connected in circuit with the passive terminal 4 and the extension 18 of solder 15. Conductor 13 is connected to the solder gripper 14 which is in electrical contact with the solder 15. The conductor 12 is connected to the passive terminal 4.

It should then be noted that the circuit is complete through conductor 12 through the passive terminal 4 through the edge 19 of the terminal 4 through the wire 3 to be soldered to the terminal board 1, through the extension 18 of the solder 15 to the conductor gripper 14 through the conductor 13 and back to the resistance detector and power control 10. The solder 15 may be provided from a solder supply 16 which may be of a feeder type or rationing type which will cause an appropriate length of solder to be emitted. Since the electrical contact for melting the solder is made only when both the edge 19 of terminal 4 and the end of solder section 18 of solder 15 are pressed to the work an on/off button may not be needed. However, if it is desired to permit the operator to make appropriate placement of the parts and to visually determine appropriate placement of the elements than an on/off switch may be provided at any appropriate point. The said on/off switch may be connected at 20 in the principal power line 8 or at 21 at the connection between the internal power supply 9 and the power control 10 being connected to an appropriate button 22 which will operate the same. It should be borne in mind again that the on/off switch at either 20 or 21 and the button 22 are not essential to the operation; but if it desired that the operator be permitted to place the elements in position and to make certain that he has an appropriate line up of all of the elements then the on/off switch is needed so that the soldering operation would not take place before the operator desires that it do so. In such case where the on/off switch is used the moment the on/off switch is pressed the solder section 18, being in circuit, will heat up and when appropriately heated to the melting point will drop off onto the work. The soldering operation will then be completed and terminated because of the opening of the circuit which becomes automatic by reason of the dropping of the melted solder.

Figure 2:
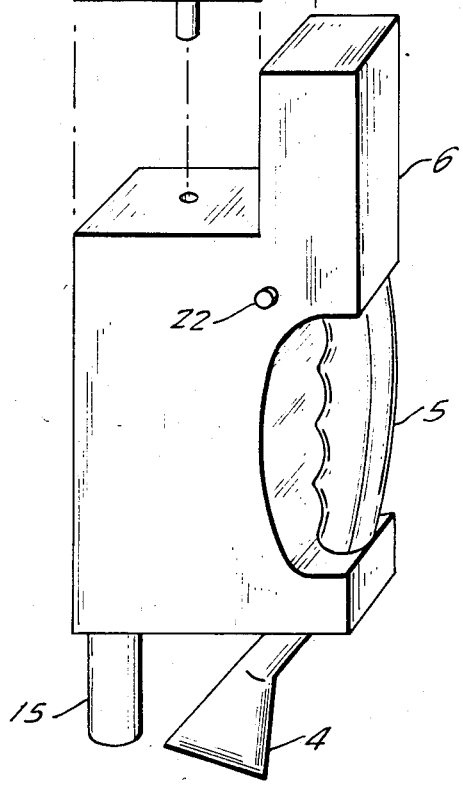
FIG. 2 is a view in perspective of one type of housing which may be used in connection with the structure of the present invention.
Figure 3:
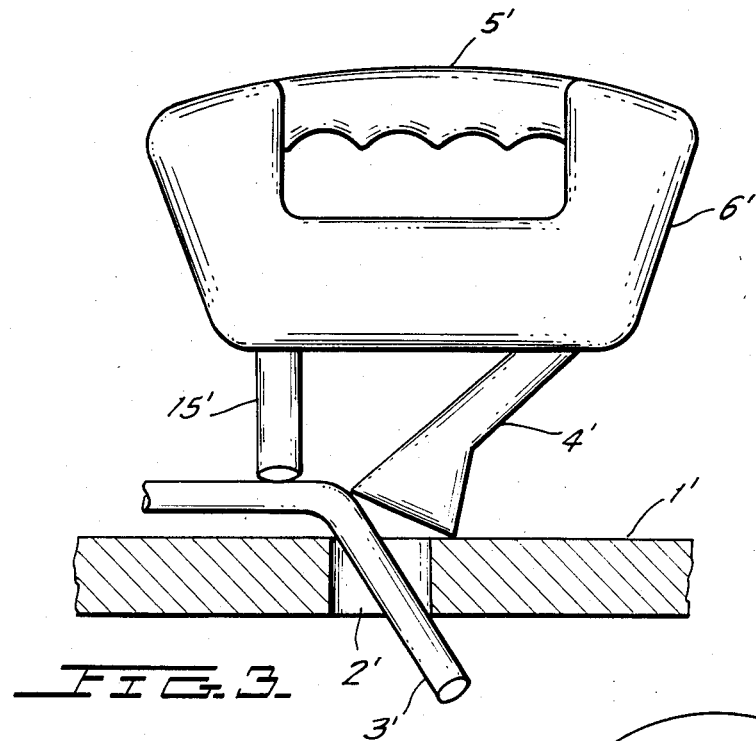
FIG. 3 is a view in perspective of another type of housing which may be used for the structure of the present invention.

In FIGS. 2 and 3 there are shown different forms which the housing may take.

There are numerous means of control of the temperature of the solder, among them are, for instance, a voltage control that limits the starting voltage across the solder. In addition, a current control may be used instead of a voltage control that limits the solder heating current. A wattage control may be used that corrects either or both of the instantaneously flowing current and the developed voltage to the solder. A resistance sensor 11 may be used that will not allow the heating power to the solder until the terminal probe and the solder contact are in low enough resistance engagement to melt the solder at the desired speed. The alloys forming the solder, the flux used, the cross-section shape and length of the solder piece the wave shape of the power pulse and all other aspects may be appropriately controlled in order to obtain the fastest possible complete melt and soldering operation in the shortest possible time.

Artificial ventilation may be provided for faster cooling of critically sensitive devices and precooled splices may be utilized. The artificial ventilation may constitute a fan on the soldering device or it may of course be provided independently.

It should be noted that the present invention utilizes the resistance of the solder for heating the solder electrically. Practically all solder is of a much higher resistance than the copper or aluminum which are the metals that are usually soldered together. By using low resistance conductors at the conductors 12, 13, 14 and 4 in the device, the heat generated by the power consumed is concentrated in the solder itself and not in the probe terminal, the connecting wires, the power supply, the control systems or in the solder grip or even in the splice itself. In a given circuit, the heat is a function of a square of the resistance. Thus if the solder has only three times the resistance of the rest of the circuit the solder will develop nine times the power or about 90% of all the heat.

The probe terminal and the solder grip terminal are both of good conducting metals which surfaces are nonsolderable by the soldering flux used. Thus, the terminals do not solder themselves to the work and the terminals do not disintegrate by erosion or solder wetting as in the present art which requires replaceable tips. The terminals may be a conductive metal like copper plated with a nonsoldering metal like aluminum or chromium. The voltages used are not dangerous to the transistors or to the user.

Various means which are well known in the art can be utilized to confine the electromagnetic field of the heavy current to a relatively small area at the work. Any dynamic field of the heavy current used will nevertheless have only a single turn relationship with any associated wiring so that it cannot develop more voltage than that which is across the solder and that voltage is far below voltages which would damage transistors or other sensitive devices.

It should be noted that the solder section 18 which is heated hotter than enough to melt has a reserve heat so as to tin all parts of the wire 3 in terminal 1 on which solder 18 falls. Wire 3 in terminal 1 spreads the heat from the solder so fast that solder 18 freezes onto the terminal board 1 and wire 3 very rapidly. The operator may therefore remove the entire unit after less than one second in place. No solder can be spilled and no part has been overheated. Accidental bridging to other terminals is much less likely to occur. Only about two average watts of power can have been used for the time with improbable danger of burns to the operator, to the bench or associated equipment. The rise in fumes are only those from short pieces of solder 18. The soldering has been done at a high enough temperature so that poor solder joints are done away with.

The present invention provides a method of providing solder splices that are substantially identical in quality and in continuity and resistance and of high life expectancy,—none of which can be expected from the present state of soldering devices.

The present invention may therefore reasonably be termed a solder dropper as opposed to a soldering iron or a soldering gun method and to that extent is quite the reverse of a solder dipping operation but nevertheless has some aspects in common.

Many additions and variations may reasonably be utilized in connection with the present invention. The shape of the solder apparatus as shown in FIGS. 2 and 3 may have many variations in order to provide appropriate aesthetic and practical design which may readily be handheld. The entire unit may even be a single long tubular element thereby integrally providing its own handle.

The solder supply 16 has been indicated as a feeding or rationing type supply. Any suitable means may be utilized in order to feed the solder down to the grippers 14. In the solder supply structure of FIGS. 4 and 5, a friction button 30 may be utilized having downwardly facing prongs 31, 31 connected by the bars 32 to the button 30 in order to move the solder down to project an appropriate length past the grippers 14. A tension spring 34 may be provided to pull the members back to their original position and the shaping of the members 31 may be such as to cause the members 31 to push on the solder 15 when the button 30 is pulled down but slide readily with respect to its surface as the spring 34 causes it to return.

Mechanical feed mechanisms of various kinds or motor driven feed mechanisms may be provided. Particular methods of feeding the solder 15 form no part of the present invention. However, the fact that a feed may be used as part of the present structure is important since the repetitive use of the solder gun makes an automatic feed possible.

Figure 6:
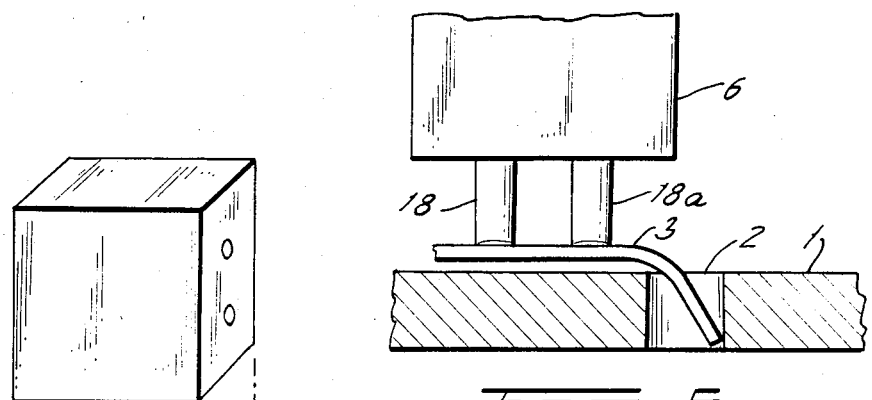
FIG. 6 is a view showing the utilization of two pieces of solder to attach a circuit element to another circuit element where the heat control is automatic on the melting of either of the two pieces of solder.

In addition, as shown in FIG. 6 the probe 4 may be replaced by a length of solder 18a to be placed on the wire 3 and terminal board 1 in order to provide a different means of soldering the wire 3 to the terminal board. It should here be kept in mind however that the timing of the operation must be such that the extensions 18 and 18a of the two pieces of solder will melt simultaneously or so closely to each other in time that they will both drop off to help create the joint at virtually the same time.

Figure 7:
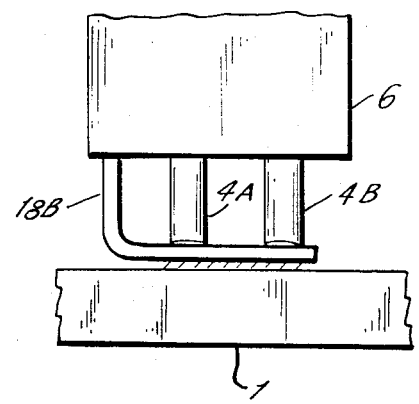
FIG. 7 is a view showing the utilization of two probes along a continuous band of solder to melt the solder between them and form a splice.

Another variation may be the structure shown in FIG. 7, wherein both elements extending from the housing 6 may constitute terminals 4a and 4b working on a piece of solder 18b which has been delivered beneath them and causing the piece of solder 18b between the two probes 4a and 4b to melt.

Many variations of the present invention are therefore obviously possible in accordance with the disclosure herein contained. In for instance the structure shown in FIG. 7, independent power supplies may be utilized for the solder 18, 18a in order to insure simultaneous melt of these elements.

Figure 4:
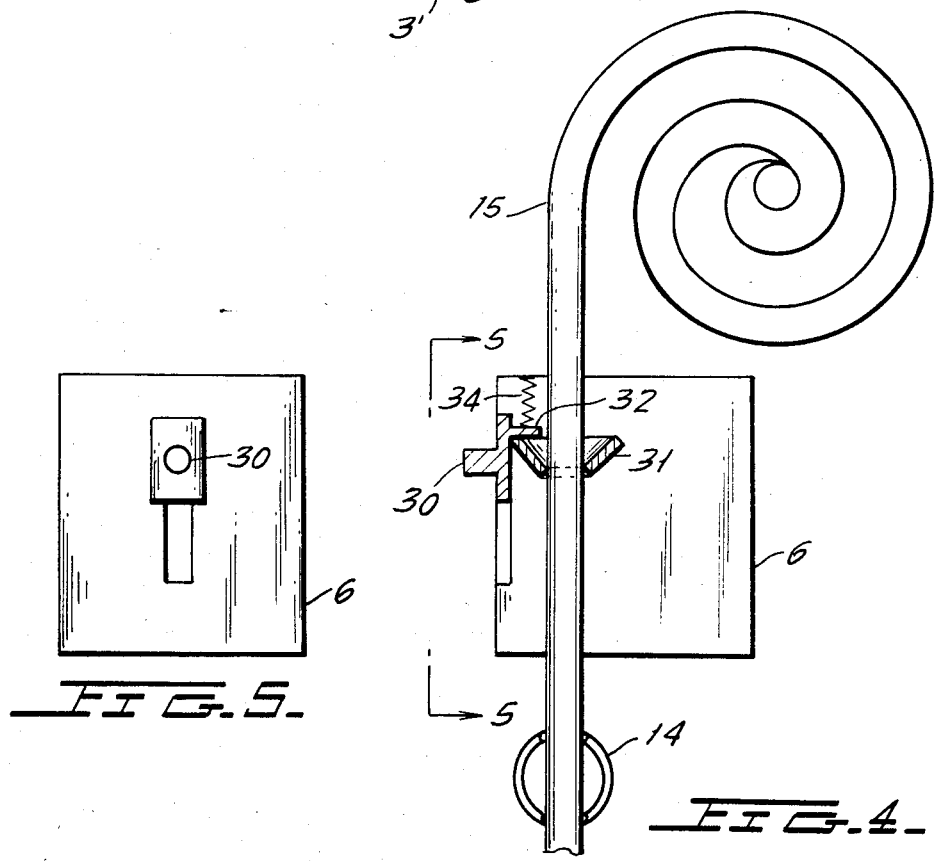
FIG. 4 is a diagrammatic view of a feed for the solder in the solder device of FIGS. 1, 2 and 3.
Figure 5:
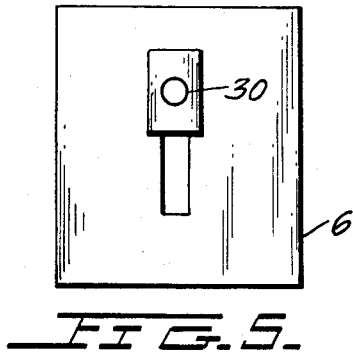
FIG. 5 is a view taken from line 5—5 of FIG. 4 looking in the direction of the arrows.

The feeding of the solder by any method such as that shown in FIG. 4, may be such as to either provide successive members of the same length or to provide successive members of different length in proportion to the requirement as needed.

The power supply controls the shape of the power pulse and thereby the exact moment of melting of the solder can be readily controlled by known means. The power supply can also be utilized to control the voltage at which the pulse starts and the current at which appropriate heating of the solder occurs to melt.

The resistance detectors senses the contact resistance of the work path and allows the melting power to flow only if the measured resistance is low enough to allow the needed current flow for the rapid melt desired.

In addition, a piece of solder may be held onto the splice and two non melting terminals as shown in FIG. 7 may be utilized to melt the solder between the two terminals and therefore result in melting an exact length of solder. The device may be varied in such a manner that the solder is progressively rolled out onto the splice in a molten condition.

It should be borne in mind that the essential element of the present invention is that the electrical heating circuit for the solder is broken and therefore timed by the melting and dropping of the solder thereby breaking the electrical connection to the grippers for the solder.

Obviously the controls and particularly the power control 10 and resistance detector 11 are regulated and programmable for different solder characteristics in order to obtain identical results where those are desired. Appropriate electrical devices and accessories may be used either inside the housing of the structure or even outside in which the power surge provided on closing the circuit is filtered to reduce the danger of high frequency waves or the harmonics of the surge for affecting nearby circuitry.

It should also be borne in mind that the solder may be automatically refed beyond the solder grippers 14 in response to the completion of the last melt.

The power source is so designed as to provide a rapid current surge to heat the solder to the greatest possible extent before it can be dropped. The solder feed means may be utilized either by hand or automatically to feed the same amount of solder at each successive stroke. The power supply pulse can have any desired pulse shape by the use of a built in control and RF filtering and the use of built in controls and RF filtering can reduce the portion of radio frequency energy that reaches the probe where it might disturb sensitive circuits. The power supply may need to reach currents of 200 amperes and have a starting voltage as high as two volts so that these may be dialed on calibrated scales connected to the power controls and resistance director. A built in ohm meter resistance sensor 11 can trigger the power pulse to start only when the power terminals of the pressure probe in the solder end have reached a low enough resistance to allow the peak power to flow.

As above pointed out the configuration may be balanced so that two solder feed terminals are used, one at each polarity. A d.c. power may be used so that the polarity attracts the solder more to one terminal than to the other and a more attractive terminal may be used as a pressure contact non wetting terminal. In the use of direct current, the polarities may be chosen for any condition desired including the use thereof to attract the solder to the wetting splice as opposed to the solder holding terminal, or to repel solder from attaching to adjacent polarized surfaces. The fact is that not only is the application of solder greatly controlled but the control is so acurate that repetitive almost identical results may be obtained.

Having described the invention, it is preferred that the scope thereof be determined, not by the specific illustrative embodiments herein contained, but only by the appended claims.

What is claimed is:

1. The method of applying solder to work to be soldered comprising the steps of applying a probe to a portion of said work and applying solder to the portion of the work to be soldered, passing current through said probe, the portion of the work to be soldered and the solder in engagement therewith and thereby heating the solder until the solder has melted, the melting of the solder interrupting the passage of current and terminating the melting of the solder; the said solder when heated by the current passing therethrough constitutes the sole source of heat for melting said solder.

2. Apparatus for applying solder under controlled conditions comprising a probe and solder support, said probe being engageable with a portion of work to be soldered, said apparatus also providing means for supporting solder in extended form to engage said work simultaneous with engagement of the work by the probe; electrical current connections to said probe and said extended solder; said current connection to said solder being located at a predetermined distance from the end of the solder to provide a predetermined amount of solder extending from said apparatus beyond said current connections; and means for controlling current through said connections whereby the current passes through said probe through the work and said solder, said solder being adapted to melt on passage of said current, said current through said connections being broken on the melting of said solder; the means for the melting of the solder is the solder itself using the resistance of that solder to develop substantially all of the heat required within that solder.

3. Apparatus for applying solder under controlled conditions comprising a probe and solder support, said probe being engageable with a portion of work to be soldered, said apparatus also providing means for supporting solder in extended form to engage said work simultaneous with engagement of the work by the probe; electrical current connections to said probe and said extended solder; said current connection to said solder being located at a predetermined distance from the end of the solder to provide a predetermined amount of solder extending from said apparatus beyond said current connections; and means for controlling current through said connections whereby the current passes through said probe through the work and said solder, said solder being adapted to melt on passage of said current, said current through said connections being broken on the melting of said solder; the solder has relatively high electrical resistance and means to heat the solder is provided by the electrical current flowing through the relatively high resistance of that solder.

* * * * *